(12) United States Patent
Aue

(10) Patent No.: US 7,945,210 B2
(45) Date of Patent: May 17, 2011

(54) METHOD AND ARRANGEMENT FOR REDUCING THE MUTUAL INTERFERENCE OF NETWORK SUBSCRIBERS IN RADIO NETWORKS

(75) Inventor: Volker Aue, Dresden (DE)

(73) Assignee: NXP B.V., Eindhoven (NL)

( * ) Notice: Subject to any disclaimer, the term of this patent is extended or adjusted under 35 U.S.C. 154(b) by 1000 days.

(21) Appl. No.: 11/722,352

(22) PCT Filed: Dec. 13, 2005

(86) PCT No.: PCT/IB2005/054206
§ 371 (c)(1),
(2), (4) Date: Jun. 20, 2007

(87) PCT Pub. No.: WO2006/067672
PCT Pub. Date: Jun. 29, 2006

(65) Prior Publication Data
US 2010/0022262 A1    Jan. 28, 2010

(30) Foreign Application Priority Data
Dec. 20, 2004    (EP) ..................................... 04106726

(51) Int. Cl.
*H04B 1/00*    (2006.01)
(52) U.S. Cl. ......... 455/63.1; 455/522; 455/69; 375/252; 375/242; 375/244; 375/247
(58) Field of Classification Search ................. 455/522, 455/69, 63.1; 375/252, 242, 244, 247
See application file for complete search history.

(56) References Cited

U.S. PATENT DOCUMENTS

| 7,522,669 B2 * | 4/2009 | Husted et al. ................. 375/252 |
| 2003/0104831 A1 * | 6/2003 | Razavilar et al. ............ 455/522 |
| 2004/0239485 A1 | 12/2004 | Sacksteder |

FOREIGN PATENT DOCUMENTS

| EP | 0698976 A1 | 2/1996 |
| EP | 698976 A1 * | 2/1996 |
| EP | 1139606 A1 | 10/2001 |
| WO | 2004077847 A2 | 9/2004 |

\* cited by examiner

*Primary Examiner* — Lewis G West
*Assistant Examiner* — April G Gonzales

(57) ABSTRACT

The object of the invention, which relates to a method and an arrangement for reducing the mutual interference of network subscribers in radio networks, is to provide a solution by means of which data collisions are reduced and thus the data throughput rate of a radio cell is increased. According to the invention, this object is achieved in terms of the method in that the cell size of a radio cell is adjusted by reducing the receiver sensitivity of one or more devices belonging to the radio cell if the device receives interference which disrupts its communication from another device belonging to a different radio cell.

19 Claims, 4 Drawing Sheets

| Distance [m] | Pr [dBm] | Distance [m] | Pr [dBm] |
|---|---|---|---|
| 1 | -18 | 80 | -56 |
| 2 | -24 | 100 | -58 |
| 5 | -32 | 200 | -64 |
| 4 | -30 | 400 | -70 |
| 8 | -36 | 800 | -76 |
| 10 | -38 | 1000 | -78 |
| 20 | -44 | 2000 | -84 |
| 40 | -50 | 4000 | -90 |

FIG. 3a

| Description | Unit | Mode | | | | | | | |
|---|---|---|---|---|---|---|---|---|---|
| Data Rate/Mode | Mbps | 6 | 9 | 12 | 18 | 24 | 36 | 48 | 54 |
| Sensitivity required by IEEE 802.11 | dBm | -82 | -81 | -79 | -77 | -74 | -70 | -66 | -65 |
| Additional SNR requirement from 6 Mbps | dB | 0 | 1 | 3 | 5 | 8 | 12 | 16 | 17 |
| Sensitivity achieved by today's implementations: | dBm | -90 | -89 | -87 | -85 | -82 | -79 | -75 | -73 |

FIG. 3b

METHOD AND ARRANGEMENT FOR REDUCING THE MUTUAL INTERFERENCE OF NETWORK SUBSCRIBERS IN RADIO NETWORKS

The invention relates to a method of reducing the mutual interference of network subscribers in radio networks, wherein, within a cellular radio network comprising at least two radio cells, in one of these radio cells devices assigned to said radio cell communicate with one another or via a common access point.

The invention also relates to an arrangement for reducing the mutual interference of network subscribers in radio networks.

The method and the arrangement relate to all cellular radio networks, wherein the cells of such radio networks may each have a central access station. A central access station is to be understood here as meaning that the station is arranged within the cell, but is not necessarily arranged in the center of said cell. Furthermore, the central access station has the possibility of being able to contact all the mobile and/or non-mobile devices belonging to said cell, via a radio link. In the following description, reference will be made primarily to one special embodiment of cellular radio networks.

The number of wireless local networks (WLAN=Wireless Local Area Networks), which can be used both commercially and privately, is continually increasing. A further rise in WLAN networks is also expected in the coming years, with increasing numbers of mobile devices being equipped with WLAN technology. The available frequency bands are thus increasingly being filled.

Current WLAN networks are based on the IEEE 802.11 standard and operate in the license-free 2.4 GHz band and in the license-free 5 GHz band. In order to prevent data collisions between the stations, use is usually made of the distributed coordination function (DCF) specified in the IEEE standard. Switching of the data links between the stations or between the access point and a station is usually effected on a random basis.

When a current wireless data transmission between two devices within a radio cell is terminated, that is to say the medium for data transmission is no longer occupied, the next data transmission link is set up following expiry of a DIEFS period (DIFS=distributed coordination function interframe space) within a contention window. Within this contention window, all stations which wish to transmit data send their request by a random function in a temporally stacked manner (slot time). This temporal stacking of the channel requests is intended to prevent the situation whereby two or more stations transmit data at the same time and thus block the channel in a disruptive manner. The stations of the wireless network are able to detect a free or occupied channel. Each station thus registers the first transmitted channel requirement request and thus subsequently adjusts its own transmitting activities. Following this contention window, data transmission takes place from the station which was assigned the channel within the contention window for the next data transmission phase to another station within the same radio cell or to the associated access point, for example in the form of defined data frames.

In order to prevent collisions, the possibility exists of transmitting the remaining duration of the current transmission sequence, including the time to transmit a response frame, as a data element in the current data frame.

Another means of preventing collisions in the case of so-called hidden nodes is the RTS-CTS mechanism. A hidden node is a station or an access point which is not visible to another station, for example in cells which are large in spatial terms. When using the RTS-CTS mechanism, which is likewise specified in the IEEE 802.11 standard, a request-to-send (RTS) packet is transmitted prior to any transmission of a data packet, said request-to-send packet being followed by a confirmation from the receiver by means of a clear-to-send (CTS) packet. Here, both packets in each case contain an information item regarding the remaining duration of the current data transmission sequence in a so-called NAV field (NAV=Network Allocation Vector). By virtue of this mechanism, the likelihood of a possible collision is further reduced, since a data transmission can be started only once this procedure has been concluded correctly.

With an arrangement of two radio cells at a short distance from one another, which radio cells each contain an access point and one or more stations, this leads to (usually only partial) overlapping of the two radio cells. If the two access points operate on the same channel, this also leads to collisions during data transmission. On account of the only partial overlapping of the radio cells, stations of the first radio cell for example which do not lie in the overlap region of the second radio cell cannot receive information about data transmission activities in the second radio cell and moreover constitute a hidden node for the second radio cell. In this scenario, too, it is advantageous to use the RTS-CTS mechanism to prevent collisions. In this way, firstly the likelihood of interference is reduced and secondly the bandwidth or data throughput of the two radio cells is reduced. The reason for this is that, during data transmission activities in the first radio cell, no activities can take place in the second radio cell, and vice versa. By increasing the number of neighboring radio cells which overlap the cell range, the data throughput may be further reduced.

The cell size is defined by the maximum range over which devices can communicate with the access point. This range depends on the transmission power of the transmitter, the sensitivity of the receiver and the path losses (P1) which occur. For a given transmission power (Pt), the reception power (Pr) can be obtained by the formula $$Pr = Pt - P1 \tag{1}$$

when Pr, Pt and P1 are given in dB.

In the case of unhindered propagation in free space, the path loss can be calculated by the formula $$P1(dB) = -10 * \log((Gt * Gr * \lambda^2)/((4*\pi)^2 * d^2)) \tag{2}$$

wherein Gt is the gain of the transmitter antenna, Gr is the gain of the receiver antenna, $\lambda$ is the wavelength and d is the distance between the transmitter and the receiver.

A reduction in collisions and an increase in data throughput within the overlapping radio cells is possible by reducing the cell sizes, wherein this is done by reducing the transmission power of the access point.

However, according to the prior art, this possibility exhibits the following disadvantages: Firstly, an adjustment of the transmission power is not specified in the standard in respect of the 2.4 GHz band, and thus is not possible with most of the WLAN devices currently available. Secondly, the user of a first radio cell can change only the transmission power of his own cell, but not the second and/or third radio cell which affects his in an interfering manner.

Reducing the transmission power of one's own radio cell thus leads only to an increase in data throughput in the neighboring radio cells but not in one's own cell since the latter is still subject to interference from the neighboring radio cells. Moreover, reducing the size of one's own radio cell means that the latter is harder or impossible for the neighboring cells to detect, and this leads to an increase in the likelihood of collision of the cells.

It is therefore an object of the invention to provide a method and an arrangement for reducing the mutual interference of network subscribers in radio networks, whereby a reduction in data collisions and thus an increase in the data throughput rate of a radio cell is achieved.

According to the invention, this object is achieved by an arrangement of the type mentioned above in that the cell size of a radio cell is adjusted by reducing the receiver sensitivity of one or more devices belonging to the radio cell if the device receives interference which disrupts its communication from another device belonging to a different radio cell.

If a receiver of a device of one's own radio cell receives a signal level of a transmitted packet from a transmitter which does not belong to one's own radio cell, this information regarding receipt of the packet is stored in the device itself along with an associated value for the received field strength RSSI (RSSI=Received Strength Signal Indicator). As an alternative to the RSSI value, it is also possible to use an interference level generated in the receiver, which is a measure of the degree of interference of one's own data reception due to interfering stations. The degree of interference of one's own data transmission is derived from the RSSI value and/or the interference level, and the sensitivity of the receiver is adjusted if necessary, taking account of the predefined limit values. This change may be made to the same extent for all devices or may be made differently depending on the ambient conditions. By virtue of this reduction in sensitivity, the radius of the radio cell as seen from the receiver is reduced. On account of this reduction in size of the receiving radio cell, the device causing the interference now lies outside the radio cell and can no longer affect one's own data transmission in an interfering manner.

In one embodiment of the invention, it is provided that the receiver sensitivity is reduced to one or more fixed values.

The reduction in the sensitivities of the receivers, according to the invention, may take place according to fixedly predefined values. Value tables may be stored for various radio network topographies, said value tables containing various stages of the reduction in receiver sensitivity. In the event of interference by devices of neighboring radio cells, these values can be read from one of the tables and the receiver sensitivities can be changed accordingly.

In one embodiment of the invention, it is provided that the receiver sensitivity is reduced to one or more values dependent on the present ambient conditions.

Based on the RSSI value and/or the interference level generated in the receiver, a decision is made regarding the extent of the reduction in sensitivity. This may lie, in a so-called link budget, between zero, that is to say no reduction in sensitivity, and a maximum permissible value. This value must be selected such that useful data reception is still possible. The decision can be made and the extent can be determined either in the receiver itself or else centrally, for example in the associated access point. In the case of central processing of the data, all stations transmit their data to the access point. Following processing of the data, the latter transmits to each station an information item regarding the adjustment of the receiver sensitivity. This information item is received by the respective station and thus the sensitivity of the receiver is adjusted.

In a further embodiment of the invention, it is provided that the receiver sensitivity is reduced and the transmission power is adapted.

According to the invention, the possibility exists of using the link budget available for reducing the size of the radio cell either only to reduce the receiver sensitivity or to reduce the receiver sensitivity and the transmission power of the devices.

In the latter case, the link budget is split between the reduction in receiver sensitivity and the reduction in transmission power, in equal or unequal proportions. In the neighboring radio cells, the reduction in transmission power manifests itself as a positive reduction in interference and thus to an increase in the data throughput rate.

In a further embodiment of the invention, it is provided that a link between two devices of a first radio cell, which is overlapped by a second radio cell, is set up by adapting the receiver sensitivity and transmission power to one another.

If a link for data transmission is to be set up between two spatially close devices within another radio cell which overlaps one's own radio cell, it is likewise necessary to reduce the receiver sensitivity or the receiver sensitivity and the transmission power. By virtue of this reduction in sensitivity, the devices which are arranged close to one another can now just receive from one another. In this case, too, the reduction in transmission power has a positive effect on the other radio cells.

According to the invention, the object is achieved by a method of the type mentioned above in that the processor is connected to the receiver by a sensitivity control line which controls the receiver sensitivity.

An arrangement for reducing the mutual interference of network subscribers in radio networks consists of an antenna and an assembly comprising a transmitter, a receiver and a processor. Here, the antenna is connected both to the transmitter and to the receiver. The processor is connected to the transmitter by a transmitted data line and a first control line for adjusting the transmission power. Furthermore, the processor is connected to the receiver by a received data line, a line for transmitting the received strength of a received packet and a second control line for adjusting the receiver sensitivity. The receiver transmits to the processor, in respect of each received packet, regardless of whether this is a packet from a device of one's own radio cell or of a different radio cell, an information item regarding the received strength of the respective packet. Said processor implements the method according to the invention and controls the sensitivity in the receiver via the second control line. In the case of central processing of the information items, the information item regarding the received strength of the respective packet is transmitted to the information-processing station. The latter also receives information items regarding the received strength level from other devices of the radio cell. Following information processing within the station, the latter transmits to each participating device an information item regarding the adjustment of the receiver sensitivity. This information item is detected in the device by the processor and thus the sensitivity of the receiver is changed via the second control line.

The invention will be further described with reference to examples of embodiments shown in the drawings to which, however, the invention is not restricted.

FIG. 3a shows a table of the dependence of the receiver sensitivity on the distance between transmitter and receiver.

FIG. 3b shows a table of the receiver sensitivities, defined in the IEEE 802.11a and g standard, as a function of the operating mode and associated technical parameters of today's implementations.

Figure 1:
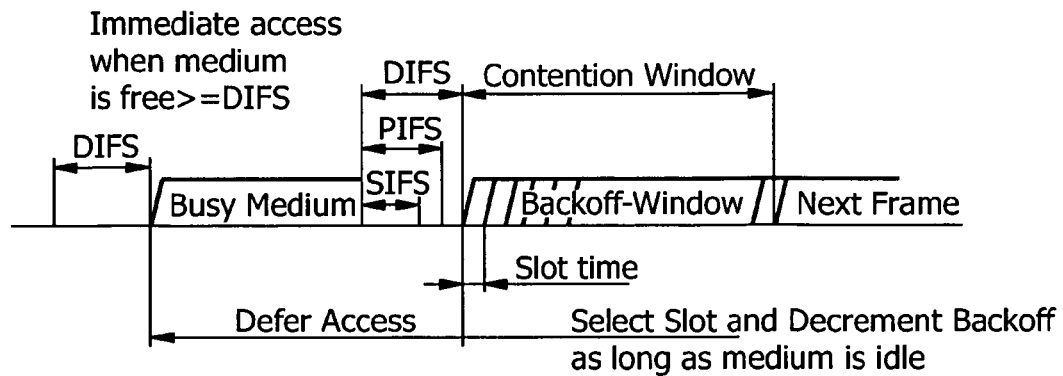
FIG. 1 shows the setting-up of a link according to the IEEE 802.11 standard.

FIG. 1 shows a procedure defined in the IEEE 802.11 standard for the random allocation of a free channel. Once a current data transmission on a channel in question has ended, that is to say the "busy medium" phase has ended, there then follows a time portion which is referred to in the standard as the DIFS phase. Following this is the actual contention window in which stations which wish to occupy the channel transmit their channel request. In order to prevent collisions, that is to say when two stations transmit their channel request at the same time and thus interfere with one another and with others, the channel requests are delayed on a random basis. Two or more stations thus do not transmit at the same instant, since the transmission instant of the respective channel request of each transmitter is calculated from an end instant of the preceding DIFS phase plus a slot time, the position of which is determined by the random generator. The channel is allocated to the station which transmits its channel request first. All the other stations register this request by detecting the occupied channel and adjust their own activities until the end of the current data transmission phase, wherein it is possible for the non-active stations to discover the remaining duration of the current transmission sequence, including the time to transmit a response frame as a data element, from the transmitted data frame. A subsequent channel allocation in turn takes place in accordance with the described procedure.

Another means for preventing collisions in the case of so-called hidden nodes is the RTS-CTS mechanism described in the IEEE 802.11 standard, in which, prior to each data transmission, a request-to-send (RTS) packet has to be confirmed by a clear-to-send (CTS) packet.

Figure 2:
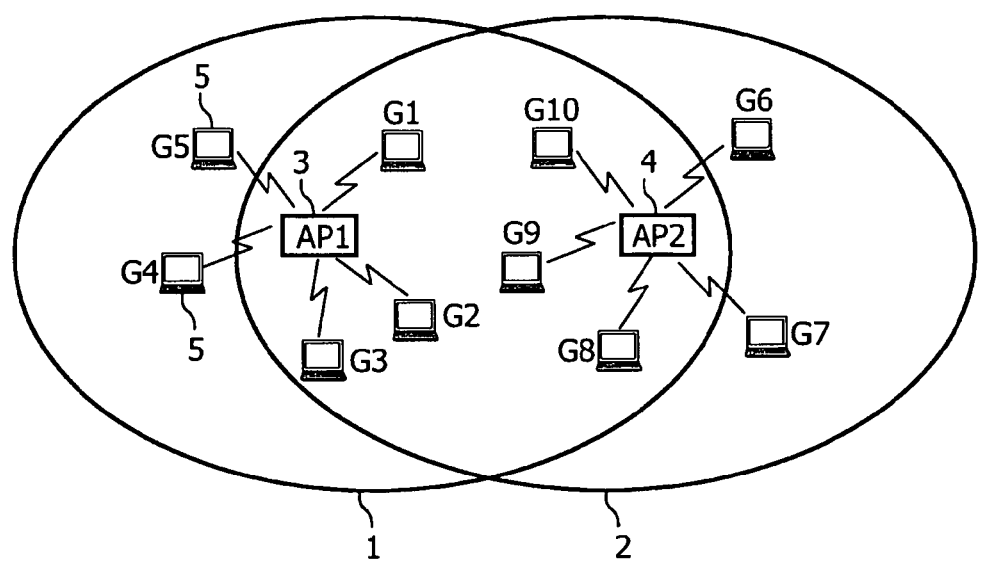
FIG. 2 shows an arrangement of two neighboring radio cells which overlap one another.

FIG. 2 shows an arrangement of two radio cells 1 and 2, wherein each radio cell consists of an access point 3 or 4 and five devices 5. On account of the spatial closeness of the two radio cells 1 and 2, the radio coverage ranges of the two cells overlap one another. The devices G1, G2 and G3 of the first cell 1 therefore lie within the radio coverage range of the second cell 2 and the devices G8, G9 and G10 of the second cell 2 lie within the radio coverage range of the first radio cell 1. If both cells 1 and 2 operate on the same channel, a data transmission in the neighboring cell leads to these devices detecting an occupied channel and thus to the inactivity of these devices. On account of this mutual interference, the data throughput rate is reduced in both cells 1 and 2.

Another problem in such an arrangement is likewise the problem of hidden nodes. For example, in the arrangement shown in FIG. 2, the device G4 does not lie within the radio coverage range of the second cell 2. If this device is selected in the channel contention window of the first radio cell 1, it subsequently transmits a data packet to its access point 3. If the access point 4 of the neighboring cell 2 transmits a data packet to any device within its cell during this time, this leads to a collision of the data packets, wherein especially the first access point 3 cannot receive the packet intended for it. This possible case leads to the need to retransmit the packet to be transmitted from the device G4 to the first access point 3, and thus to a reduction in the data throughput in both cells 1 and 2. For this case of the partially overlapping radio coverage ranges with hidden nodes, the use of the RTS-CTS mechanism may likewise be used to reduce collisions.

The receiver sensitivity is a technical parameter which depends on the respective device and defines the limit for the smallest signal which can still be detected. In practice, the receiver sensitivity of the device must be less than or equal to the sensitivity for the smallest data transmission rate which is defined by the IEEE 802.11 standard. The higher sensitivity requirements for higher data transmission rates result from additional signal-to-noise ratio (SNR) requirements in the receiver. FIG. 3a shows the dependence of the receiver sensitivity on the distance between transmitter and receiver for various distances. This table has been drawn up using formulae (1) and (2). The basis used here was a transmission power Pt of 16 dBm, a receiver and transmitter antenna gain of 3 dB in each case and a transmission frequency of 2.4 GHz.

For the OFDM mode (OFDM=Orthogonal Frequency Division Multiplexing), which is defined in IEEE 802.11a and g as an extension of the standard, the receiver sensitivities defined for various data transmission rates are shown in the table in FIG. 3b. This table also shows practical sensitivity values of today's implementations, which are at least 8 dB higher than the standard requirements.

In the case of unhindered propagation in free space, the range doubles for an increase in sensitivity of 6 dB. If the sensitivity is increased by 8 dB, the range is then increased accordingly by a factor of 2.5.

It can be seen from FIGS. 3a and 3b that, with the currently available WLAN technology, assuming unhindered propagation in free space, for a data rate of 6 Mbps, secure data transmission takes place between two stations which are located at a distance of 4 km from one another.

Since the currently available implementations considerably exceed the standard sensitivity requirements, the radio cells which can be produced with this technology have increasingly large dimensions. These dimensions are moreover not reduced by the maximum transmission power of 20 dBm for frequencies around 2.4 GHz as defined in the standard. The abovementioned problems will therefore increase as the overlapping of the radio cells increases, wherein this effect is further intensified by the continuing increase in the number of radio cells. Accordingly, if two stations of overlapping radio cells operate at the same frequency, the data transmission capacity thereof on this channel is reduced. With complete overlapping of the radio fields, the data transmission capacity is thus reduced to approximately half the maximum possible value. A higher sensitivity of the receiver on account of technical advances is therefore damaging in terms of the performance.

The solution according to the invention reduces the size of the radio cells by reducing the receiver sensitivity. If this solution is applied both to one's own radio cell and to the other radio cells, the size of the radio cells is also reduced in the neighboring cells which it is otherwise not possible to influence.

The parameters of transmission power, path losses and receiver sensitivity affect the size of the radio cell. The solution according to the invention influences the parameters of transmission power and receiver sensitivity in such a way that, when the size of the radio cell is reduced, the data throughput rate is increased and at the same time the interfering effect on neighboring cells is reduced.

Depending on the signal strengths of the received signals which are received from devices belonging to one's own radio cell, the sensitivity level of the devices is changed and thus the effect of the interfering devices is reduced. The reduction in the sensitivities of the devices of a cell reduces the data transmission distance which can be bridged between two devices of this cell and can thus be regarded as a reduction in cell size, whereby it is possible to screen out an interfering signal from a device belonging to a neighboring radio cell. This screening-out of the interfering signal has the effect of increasing the performance of one's own radio cell.

According to the IEEE standard, two sensitivity levels are defined for each receiver. The first setting (the detection or receiver sensitivity) relates to the sensitivity level at which received packets can still be detected and demodulated. The second setting (the "channel free" sensitivity) defines the value at which it is possible to distinguish between an occupied channel and a free channel.

When there are conditions for reducing the receiver sensitivities, this reduction may be made to a value defined by the standard or furthermore to values outside those defined by the standard. The transmission power of the devices of the radio cell in question may also be reduced at the same time as the receiver sensitivities are reduced.

Figure 4:
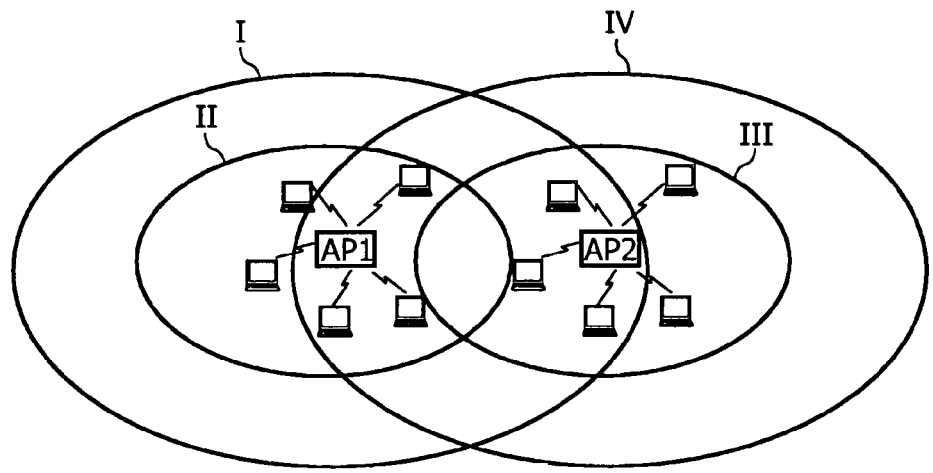
FIG. 4 shows an arrangement of two neighboring radio cells which overlap one another, with automatic adjustment of the cell size by influencing the sensitivity.

These operations are shown in FIG. 4. Here, areas I, II, III and IV depict the size of the two radio cells 1 and 2 under various conditions.

The areas are as follows

I a radio cell size of the stations which operate with maximum receiver sensitivity and which belong to access point one (AP1) 3, II a radio cell size of the stations which operate with a receiver sensitivity reduced according to the method and which belong to access point one (AP1) 3, III a radio cell size of the stations which operate with maximum receiver sensitivity and which belong to access point two (AP2) 4, and IV a radio cell size of the stations which operate with a receiver sensitivity reduced according to the method and which belong to access point two (AP2) 4.

The original radio cell size of the first radio cell 1 comprising the access point AP1 3 is reduced to the size of area II of radio cell 2 by virtue of the method according to the invention. The stations of the first radio cell 1 thus no longer receive from any interfering devices of the neighboring second radio cell 2, since their receiving range has been limited to II. As the interfering signals have thus been screened out, the data throughput of the first radio cell 1 is increased again, since account no longer has to be taken of the data transmissions in the neighboring second radio cell 2 which are expressed by waiting cycles. Advantageously, the reduction to the size of radio cell II is achieved by a compromise consisting of a reduction in receiver sensitivity and a reduction in transmission power.

Figure 5:
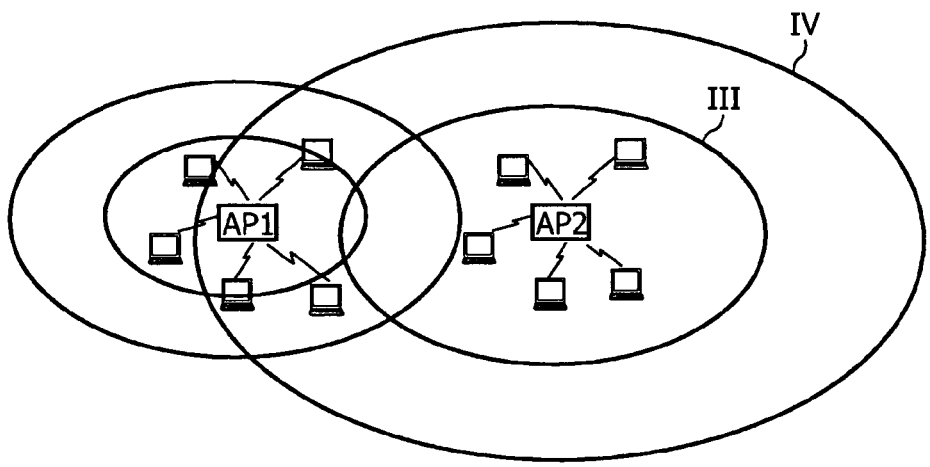
FIG. 5 shows an arrangement of two neighboring radio cells which overlap one another, with automatic adjustment of the cell size within the first cell by influencing the sensitivity and the transmission power.

A first radio cell 1, in which both the sensitivity of the receiver and the transmission power of the transmitter are reduced, is shown in FIG. 5. Seen from the point of view of the devices 5 belonging to the first radio cell 1, there is also a reduction in the size of the second radio cell 2 from the area IV to the area III, since they can no longer receive from any device 5 of the second radio cell 2 on account of the reduction in their own receiver sensitivity.

Figure 6:
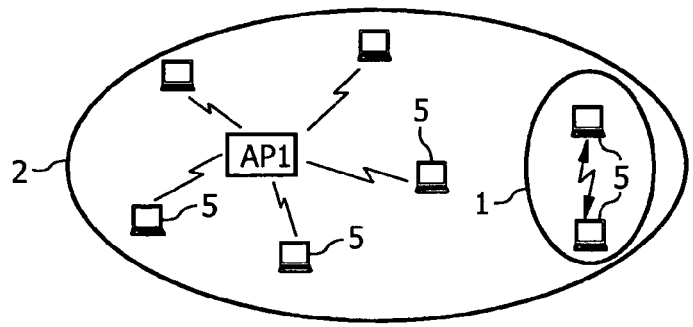
FIG. 6 shows an arrangement of two overlapping radio cells, wherein a data link between two devices is set up within the overlapped radio cell without using an access point.

A further advantage of the invention consists in that a link for data transmission is set up between two spatially close devices 5 within another radio cell which overlaps one's own radio cell. Such a scenario is shown in FIG. 6. When transmitting data over short distances, such as for example in the case of links between a laptop and a mobile telephone, a PDA, a video camera or camera or an MP3 player lying immediately beside said laptop, wherein the link is usually set up without the use of an access point 3 or 4, the receiver sensitivity of the devices 5 involved in the data transmission is reduced using the method. In this case, too, it is possible to reduce the transmission power of the devices 5. This reduction in the radio cell size to the two participating devices 5 makes it possible to set up the link between the two devices 5 despite one's own radio cell 1 being overlapped by another radio cell 2, provided that the interference caused by the devices 5 of the overlapping radio cell 2 still permits reception in one's own radio cell 1.

Figure 7:
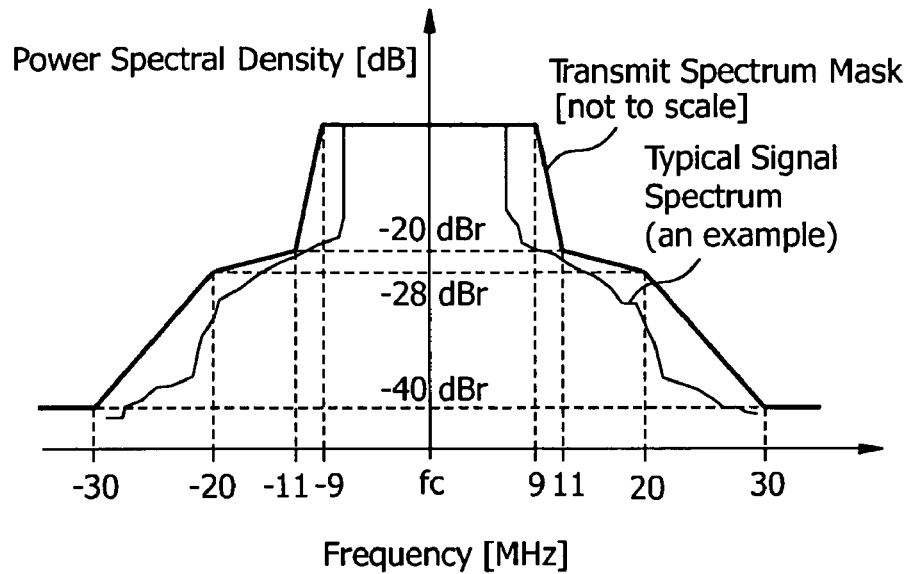
FIG. 7 shows a frequency spectrum of a transmitter as specified in the IEEE 802.11a standard.

Another advantageous use of the method according to the invention is possible for the case described below. The frequency response requirements of the IEEE 802.11 standard define a frequency response as shown in FIG. 7 for a transmitter. Compared to standard requirements for cellular mobile telephones, these requirements are not as high. According to said requirements, a neighboring channel is shifted by a frequency of 20 MHz with respect to one's own channel. The defined signal level attenuation in the region of a neighboring channel ensures that the latter cannot be demodulated in a receiver. Nevertheless, this signal level may give rise to limitations in terms of performance in a receiver. For the case of two radio cells 1 and 2 which overlap with their radio coverage ranges and operate on neighboring channels, the reduction in receiver sensitivity furthermore gives rise to better suppression of the neighboring channel.

One possibility for determining a receiver sensitivity level in order to adapt the radio cell size consists in evaluating the RSSI signal (RSSI=Received Signal Strength Indication) of the receiver, which is transmitted via the RSSI line 14 from the receiver to an associated processor. This signal indicates the received strength of the received packet. This signal is generated for each received packet. The RSSI signals of the devices 5 belonging to the radio cell 1 or 2 are evaluated either decentrally or centrally. Following this evaluation, in the case of central evaluation, adjustment values are transmitted back to all the devices 5 of the radio cell 1 or 2, wherein the sensitivity adjustment values may be different for each device 5. The sensitivity of the receiver is then changed by a processor arranged in the respective device 5, via the sensitivity control line.

This operation of transmitting the RSSI signals to the evaluation unit and evaluating them and subsequently adjusting the sensitivity on the basis of the adjustment values takes place in a periodic manner. It is therefore possible for example to reduce the size of the radio cell 1 or 2 over a number of periods, until an optimal setting has been found which screens out interference and promotes one's own transmission activities. Moreover, it is thus possible to react in a flexible manner to changes for example in the transmission channel or in the ambient conditions. In such an adjustment operation, the possibility exists of influencing not just the receiver sensitivity but also the transmission power of the devices 5, and of analyzing the changed conditions in the radio cell 1 or 2 in a subsequent period.

A second possibility for determining a receiver sensitivity level in order to adapt the radio cell size consists in using both the RSSI signals of packets from one's own cell and from other cells for evaluation purposes. In this case, too, it is possible for either just the receiver sensitivity or the receiver sensitivity and the transmission power to be changed.

A further possibility consists in using an interference level. This is a measure of the degree of interference caused to one's own data reception by interfering stations, and is generated in the receiver. It is likewise possible to derive from this level, as described above, the adjustment values for the receiver sensitivity level and the transmission power.

Figure 8:
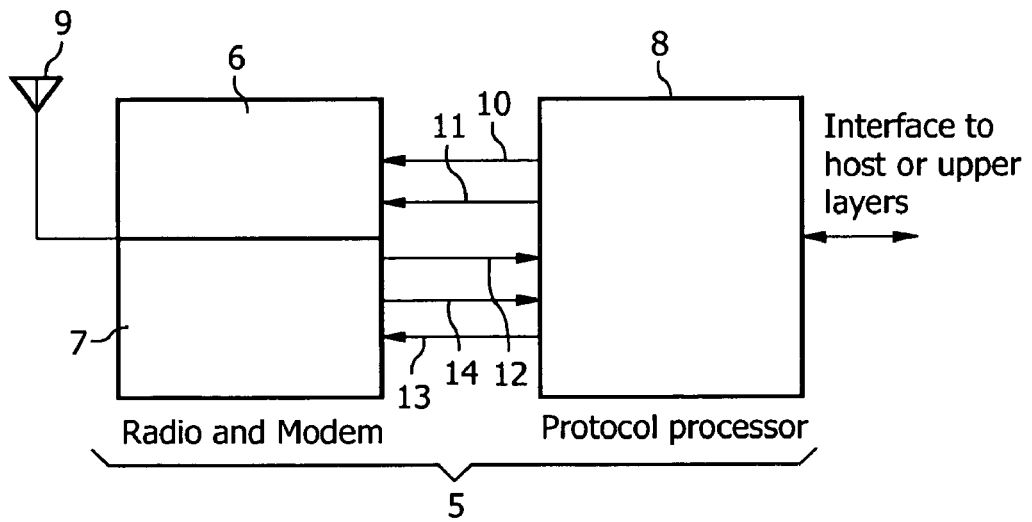
FIG. 8 shows an arrangement according to the invention for automatic adjustment of the cell size.

FIG. 8 shows an arrangement of a wireless LAN device 5. This consists of an antenna 9 which is connected to the transmitter 6 and the receiver 7. The transmitter 6 is connected to the processor 8 via a first data line 10 for transmitting the transmitted data and a first control line 11 for controlling the transmission power. The receiver 7 is connected to the processor 8 via a second data line 12 for transmitting the received data, an RSSI line 14 for transmitting the received strength signal and the second control line 13 for controlling the receiver sensitivity of the receiver 7. The method according to the invention is implemented for example in a protocol stack to be run by a processor 8. It is assumed that a channel is defined by the network operator or is selected dynamically in accordance with the IEEE 802.11h or k standard. The received strength signal of the received packet is measured in a physical layer. The received data packet and the RSSI signal are transmitted to the protocol stack and MAC processor of the device 5. The RSSI signals 14 are monitored by the protocol processor 8 and classified depending on whether they are signals of packets from one's own radio cell or from another radio cell. This distinction can be made for example on the basis of the MAC address. For the case of a scenario as shown in FIG. 6, the source address must be identical to the MAC address of the cooperating station. In this case, the MAC addresses of all the participating stations must be stored in the devices in a local database.

Upon receipt of each packet, the following actions are necessary:

A The receiver 7 continually determines the link safety margin, which is obtained from the difference between the minimum received signal strength of a device 5 belonging to one's own cell and the maximum sensitivity minus a safety range. This safety range includes at least the minimum SNR requirements for the 6 Mbps mode of a receiver 7.

By way of example, for a minimum received signal strength of a device 5 belonging to one's own cell of −57 dBm and a maximum receiver sensitivity of a commercially available device of −73 dBm, for a transmission rate of 54 Mbps (cf. FIG. 3b), a link safety margin of 10 db is obtained when observing a safety range of 6 dBm. This link safety margin can then be used to reduce the sensitivity and/or to reduce the transmission power.

The minimum required link sensitivity is calculated from the sum of the maximum receiver sensitivity plus the link safety margin. For this example, this is −63 dBm. Based on this result and the additional SNR requirements for the highest data rate of 17 dB at 54 Mbps, a minimum sensitivity for the lowest frequency of −80 dBm is obtained.

B At the same time, the receiver 7 determines the maximum signal strength of signals from the stations which do not belong to one's own radio cell, and determines an interference level therefrom. The sensitivity of the detection algorithm can be reduced when either the interference level or the minimum required link sensitivity for the lowest data rate or the minimum sensitivity for the lowest frequency, as defined in the standard, permits a reduction. If, for example, the maximum received strength of a packet received from a device 5 of another cell has a value of −85 dBm, the value is smaller than the sensitivity of −82 dBm required by the standard and the minimum sensitivity depending on the device 5 is at a value of −80 dBm, the receiver sensitivity is fixed at −85 dBm.

C When adjusting the transmission power, for example in order to reduce the power consumption of the device 5 or to further increase the capacity, the available link budget, which corresponds to the range available for reducing the parameters of sensitivity and transmission power, must be split between the two parameters.

A distinction is made here between two cases. For the case where the maximum received strength of a packet received from a device 5 of another cell is greater than or equal to the sensitivity required by the standard, the available link budget is split between the transmitter 6 and the receiver 7. In this case, for example, a first half of the link budget is used to reduce the transmission power and a second half of the link budget is used to reduce the receiver sensitivity.

For the case where the maximum received strength of a packet received from a device 5 of another cell is less than the sensitivity required by the standard, the available link budget is used only to reduce the transmission power of the transmitter 6.

The method according to the invention can be used in all wireless LAN devices 5, for example in mobile telephones and in devices for electronic data processing and/or data transmission. However, the possibility also exists of using the method in the form of a firmware update for existing devices which have a structure of the arrangement as required for this purpose.

LIST OF REFERENCES

1 first radio cell
2 second radio cell
3 first access point (AP)
4 second access point
5 device G
6 transmitter
7 receiver
8 processor
9 antenna
10 first data line
11 first control line
12 second data line
13 second control line
14 RSSI line
I. first possible radio cell size of the first radio cell
II. second possible radio cell size of the first radio cell
III. first possible radio cell size of the second radio cell
IV. second possible radio cell size of the second radio cell

The invention claimed is:

1. A method of reducing the mutual interference of network subscribers in radio networks, wherein, within a cellular radio network comprising at least two radio cells, in one of these radio cells devices assigned to said radio cell communicate with one another or via a common access point, characterized in that the cell size of a radio cell is adjusted by reducing the receiver sensitivity of a device belonging to the radio cell if the device receives interference which disrupts its communication from another device belonging to a different radio cell, wherein a received signal strength of a data packet that is received in the device is measured in a physical layer, that data packet and the received signal strength are classified depending on whether they are from the device's own radio cell or from another radio cell based on a MAC address, wherein a link safety margin is determined, which is obtained from the difference between the minimum received signal strength of the device and the maximum sensitivity of the device minus a safety range, wherein the link safety margin is used to reduce the receiver sensitivity of the device.

2. A method as claimed in claim 1, characterized in that the receiver sensitivity is reduced to one or more fixed values.

3. A method as claimed in claim 1, characterized in that the receiver sensitivity is reduced to one or more values dependent on the current ambient conditions.

4. A method as claimed in claim 1, characterized in that the receiver sensitivity is reduced and the transmission power of the device is adapted.

5. A method as claimed in claim 1, characterized in that a link between two devices of a first radio cell, which is overlapped by a second radio cell, is set up by adapting the receiver sensitivity and transmission power to one another.

6. A method as claimed in claim 1, wherein changes to the receiver sensitivities of all devices in the radio cell are made to the same extent.

7. A method as claimed in claim 1, wherein changes to the receiver sensitivities of all devices in the radio cell are made differently depending on ambient conditions.

8. A method as claimed in claim 2, wherein value tables are stored for radio network topographies, said value tables containing stages of the reduction in receiver sensitivity, and wherein in the event of interference by devices of neighboring radio cells, values are read from one of the value tables and the receiver sensitivities of devices are changed accordingly.

9. A method as claimed in claim 3, wherein based on a Received Strength Signal Indicator (RSSI) value and/or an interference level generated in a receiver of the device, a decision is made regarding the extent of the reduction in the receiver sensitivity of the device.

10. A method as claimed in claim 9, wherein the decision is made in the device and the extent of the reduction in the receiver sensitivity of the device is determined in the device.

11. A method as claimed in claim 9, wherein the decision is made centrally in the common access point of the radio cell and the extent of the reduction in the receiver sensitivity of the device is determined centrally in the common access point of the radio cell.

12. A method as claimed in claim 11, wherein all stations of the radio cell transmit data to the common access point of the radio cell for processing, wherein following processing of the data, the common access point of the radio cell transmits to each station an information item regarding the adjustment of the receiver sensitivity, wherein the information item is received by the respective station and the sensitivity of the respective station is adjusted.

13. A method as claimed in claim 1, wherein the size of the radio cell is reduced only by reducing the receiver sensitivity of the device.

14. A method as claimed in claim 4, wherein a link budget of the device is split between the reduction in the receiver sensitivity and the reduction in transmission power of the device in equal proportions.

15. An arrangement for reducing the mutual interference of network subscribers in radio networks comprising at least two radio cells, in which a unit consisting of transmitter and receiver is connected to an antenna, wherein the transmitter is connected to a processor via a first line for transmitting the data to be transmitted and a line for controlling the transmission power of the transmitter, and the receiver is connected to the processor via a second line for transmitting the received data and a line for transmitting a received strength signal for each received data packet, characterized in that the processor is connected to the receiver by a sensitivity control line which controls the receiver sensitivity, wherein the received signal strength of a data packet that is received in the unit is measured in a physical layer, the data packet and the received signal strength are classified depending on whether they are from the unit's own radio cell or from another radio cell based on a MAC address, wherein a link safety margin is determined, which is obtained from the difference between the minimum received signal strength of the unit and the maximum sensitivity of the unit minus a safety range, wherein the link safety margin is used to reduce the receiver sensitivity of the unit.

16. The arrangement of claim 15, wherein the unit belongs to a radio cell, and wherein the processor is configured to adjust the cell size of the radio cell by reducing the receiver sensitivity of the receiver if the unit receives interference which disrupts its communication from another unit belonging to a different radio cell.

17. The arrangement of claim 16, wherein the processor is further configured to reduce the receiver sensitivity of the receiver to one or more fixed values.

18. The arrangement of claim 16, wherein the processor is further configured to reduce the receiver sensitivity of the receiver to one or more values dependent on the current ambient conditions.

19. The arrangement of claim 16, wherein the processor is further configured to reduce the size of the radio cell only by reducing the receiver sensitivity of the receiver.

\* \* \* \* \*